(12) United States Patent
Nakamura

(10) Patent No.: US 8,522,984 B2
(45) Date of Patent: Sep. 3, 2013

(54) FILTER AND AIR CLEANER

(75) Inventor: Eizo Nakamura, Tottori (JP)

(73) Assignee: National University Corporation Okayama University, Okayama-Shi (JP)

( * ) Notice: Subject to any disclaimer, the term of this patent is extended or adjusted under 35 U.S.C. 154(b) by 628 days.

(21) Appl. No.: 12/774,172

(22) Filed: May 5, 2010

(65) Prior Publication Data

US 2010/0282669 A1    Nov. 11, 2010

Related U.S. Application Data

(60) Provisional application No. 61/176,299, filed on May 7, 2009.

(30) Foreign Application Priority Data

Jul. 22, 2009    (JP) ................. P2009-171180

(51) Int. Cl.
    *B01D 39/00*    (2006.01)
(52) U.S. Cl.
    USPC ............ 210/502.1; 96/108; 96/154; 210/483; 530/350; 530/400

(58) Field of Classification Search
    None
    See application file for complete search history.

(56) References Cited

U.S. PATENT DOCUMENTS 5,304,382 A * 4/1994 Monzyk ............... 424/489
2007/0160599 A1 * 7/2007 Acey et al. ............ 424/140.1

FOREIGN PATENT DOCUMENTS

| JP | 2003-113088 A | 4/2003 |
| JP | 2005-529938 A | 10/2005 |
| WO | WO 03/103588 A2 | 12/2003 |

* cited by examiner

*Primary Examiner* — Dirk Bass
(74) *Attorney, Agent, or Firm* — Birch, Stewart, Kolasch & Birch, LLP

(57) ABSTRACT

There is provided a filter for filtering gas or liquid, wherein a constituent material of the filter contains a protein that absorbs iron, radium, or heavy metal (except iron), the constituent material is an iron-containing fiber body 4, the iron-containing fiber body 4 is a fiber body including iron or a fiber body 41 on which iron is supported, and the protein is ferritin or hemosiderin and bound to iron of the iron-containing fiber body 4.

3 Claims, 4 Drawing Sheets

FILTER AND AIR CLEANER

CROSS REFERENCE TO RELATED APPLICATIONS

This nonprovisional application claims the benefit of U.S. Provisional Application No. 61/176,299 filed on May 7, 2009 and to Patent Application No. P2009-171180 filed in Japan, on Jul. 22, 2009. The entire contents of all of the above applications is hereby incorporated by reference into the present application.

BACKGROUND OF THE INVENTION

The present invention relates to a filter and an air cleaner which are capable of inhibiting development of cancer.

Conventionally, various theories have been presented on cancer development mechanisms, and various prescriptions for inhibiting canceration caused based on these development mechanisms have also been proposed.

For example, as for cancer development mechanisms, there is a theory that canceration of normal cells is caused through the following four stages: a first stage (initiation stage) in which mutations occur in normal cells due to ingestion of carcinogens; a second stage (promotion stage) in which mutant cells become immortalized cells; a third stage (conversion stage) in which the immortalized cells are converted into cancer cells; and a fourth stage (progression stage) in which the cancer cells cannot be eliminated by immune function and the growth of the cancer cells occurs. As a prescription for inhibiting canceration based on this theory, there has been proposed a prescription that inhibits ingestion of carcinogens in particular in the first stage or the second stage, while suggesting ingestion of substances having carcinogenesis promoter inhibiting activities such as essences of Rosaceae plants, Amygdalus plants, Prunus plants or Armeniaca plants, and amygdalin, prunasin, amygdalic acid, glucopyranosiloxy-phenylacetic acid, phenyl-b-D-gentiobioside or phenyl-b-D-glucopyranoside extracted/refined therefrom (see Patent Document 1, for example).

Alternatively, a prescription for preventing or delaying development of cancer by administering a free radical generating agent has also been proposed (see Patent Document 2, for example).

Patent Document 1 is a Japanese Unexamined Patent Application Publication No. 2003-113088.

Patent Document 2 is a Japanese Unexamined Patent Application Publication (Translation of PCT Application) No. 2005-529938.

SUMMARY OF THE INVENTION

However, although the known development mechanisms are certainly thought to be true, it is believed that these mechanisms are not all and an unknown development mechanism exists. This is because many people are still suffering from cancer.

An object of the present invention is to provide a filter and an air cleaner, which are capable of inhibiting development of cancer caused based on a new development mechanism.

While conducting studies on pleural mesothelioma that is thought to be caused by asbestos, the present inventor obtained the following findings concerning a new cancer development mechanism.

Specifically, when iron-containing amphibole asbestos, e.g., amosite or crocidolite, is taken into a human body, ferritin or hemosiderin, existing allover inside the human body and known as an iron-binding protein, is deposited in the asbestos to form an asbestos body, and a radioactive substance such as radium is deposited in this asbestos body. In particular, in the asbestos body, radium is deposited at a relatively high concentration, and therefore, the radioactive frequency of radiation emitted from radium is increased. Accordingly, the asbestos body in which radium is deposited promotes canceration of normal cells.

Further, also when an iron-containing substance other than asbestos, e.g., dust or gas containing iron, is taken into a human body, ferritin or hemosiderin is deposited in iron contained in the dust or gas to form a body, and a radioactive substance such as radium is deposited in this body. Hence, this body also causes canceration of normal cells similarly to an asbestos body. It should be noted that dust or gas containing iron is cigarette smoke, or air inside a mine or inside a steelmaking plant, for example, and the possibility of inhaling such dust or gas is relatively increased also in everyday life.

Therefore, based on the foregoing findings, the present inventor achieved the present invention by having an idea that the risk of development of cancer can be reduced if iron, radium or heavy metal (except iron) can be prevented from being taken into a human body.

Specifically, a first invention of the present application provides a filter for filtering gas or liquid, wherein a constituent material of the filter contains a protein that absorbs iron, radium, or heavy metal (except iron).

Moreover, a second invention of the present application provides an air cleaner including the filter according to the first invention.

In the first invention of the present application, iron, radium, or heavy metal (except iron), contained in the gas or liquid passing through the filter, is absorbed into the protein. Therefore, according to the first invention, the removal of iron, radium, or heavy metal (except iron) from the gas or liquid is enabled, and a cancer development factor in the gas or liquid is thus eliminated to enable inhibition of cancer development.

According to the second invention of the present application, iron, radium, or heavy metal (except iron) in air can be removed by the filter in a commonly-used air cleaner, thus enabling elimination of a cancer development factor in air.

Besides, according to the second invention of the present application, in a water-filter-type air cleaner, iron, radium, or heavy metal (except iron) in air can be removed by being dissolved in water, and furthermore, iron, radium, or heavy metal (except iron) dissolved in the water can be removed by the filter, thus making it possible to stabilize the filtering function of the water for a long period of time; accordingly, a cancer development factor in air can be eliminated with stability for a long period of time.

DETAILED DESCRIPTION OF THE PREFERRED EMBODIMENTS

Figure 1:
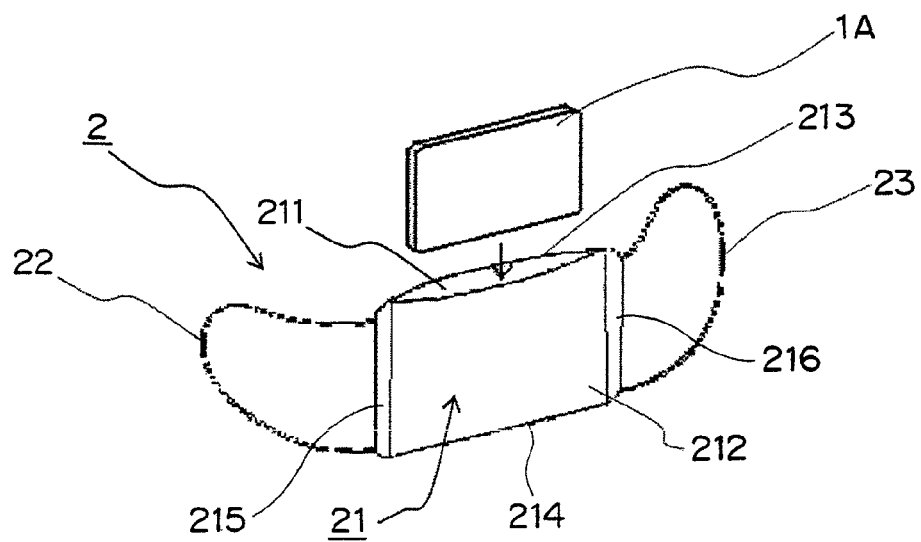
FIG. 1 is a perspective view illustrating a mask including a filter according to a first example.

A filter of the present invention filters gas or liquid, and a constituent material of the filter contains a protein that absorbs iron, radium or heavy metal (except iron).

As the above-mentioned constituent material, a fiber body containing iron, i.e., an iron-containing fiber body, can be used. The iron-containing fiber body is a fiber body made of iron or a fiber body on which iron is supported. The fiber body made of iron can be formed by cutting an iron wire at any length. The fiber body on which iron is supported can be formed by forming an iron layer entirely or partially over a surface of artificial fiber or natural fiber. This iron layer can be formed by a known method such as sputtering, vacuum deposition, electroplating or electroless plating.

As the protein, ferritin, and/or hemosiderin, which is a partial degradation product of ferritin, can be used. This protein is bound to the iron of the iron-containing fiber body. In other words, the iron-containing fiber body serving as the foregoing constituent material contains the protein. In order to allow the protein to bind to the iron of the iron-containing fiber body, the iron-containing fiber body may be immersed in a protein aqueous solution.

Forms of a filter of the present invention may include, for example, woven fabric, nonwoven fabric, molded body and mesh body.

(1) Woven fabric may be formed by weaving an iron-containing fiber body, or may be formed by twisting together iron-containing fiber bodies to make a twine and by weaving this twine. It should be noted that the twine may be made by twisting together the iron-containing fiber body and "other fiber body". In such a case, a material for the "other fiber body" is selected in consideration of flexibility, texture, moisture absorbency, etc. Furthermore, when a filter is made in the form of the woven fabric, a protein may be bound to the iron-containing fiber body before weaving, or a protein may be bound to the iron-containing fiber body after weaving. In order to allow the protein to bind to the iron-containing fiber body after weaving, the woven fabric may be immersed in a protein aqueous solution. The filter, which is made in the form of the woven fabric in this manner, may be used for a mask, for example.

(2) Nonwoven fabric can be formed by tangling an iron-containing fiber body, which is cut at a length of a few millimeters to a few centimeters, by using a known method. It should be noted that the nonwoven fabric may be formed by tangling the iron-containing fiber body and "other fiber body" with each other. In such a case, a material for the "other fiber body" is selected in consideration of flexibility, texture, moisture absorbency, etc. Furthermore, when a filter is made in the form of the nonwoven fabric, a protein may be bound to the iron-containing fiber body before tangling, or a protein may be bound to the iron-containing fiber body after tangling. In order to allow the protein to bind to the iron-containing fiber body after tangling, the nonwoven fabric may be immersed in a protein aqueous solution. The filter, which is made in the form of the nonwoven fabric in this manner, maybe used for a mask, for example.

(3) A molded body can be formed by molding an iron-containing fiber body, which is cut at a length of a few millimeters to a few centimeters, into any shape by using a known molding method; for example, the molded body can be formed by molding the iron-containing fiber body into a cylindrical shape by using a compression molding method. It should be noted that the molded body may be formed by mixing the iron-containing fiber body with "other fiber body". In such a case, a material for the "other fiber body" is selected in consideration of flexibility, texture, moisture absorbency, etc. Furthermore, when a filter is made in the form of the molded body, a protein may be bound to the iron-containing fiber body before molding, or a protein maybe bound to the iron-containing fiber body after molding. In order to allow the protein to bind to the iron-containing fiber body after molding, the molded body may be immersed in a protein aqueous solution. The filter, which is made in the form of the molded body in this manner, may be used for a cigarette, for example.

(4) A mesh body can be formed by braiding an iron-containing fiber body into a mesh pattern. It should be noted that the mesh body may be formed by braiding the iron-containing fiber body and "other fiber body" into a mesh pattern. In such a case, a material for the "other fiber body" is selected in consideration of flexibility, texture, moisture absorbency, etc. Furthermore, when a filter is made in the form of the mesh body, a protein may be bound to the iron-containing fiber body before braiding, or a protein may be bound to the iron-containing fiber body after braiding. In order to allow the protein to bind to the iron-containing fiber body after braiding, the mesh body may be immersed in a protein aqueous solution. The filter, which is made in the form of the mesh body in this manner, may be used for a commonly-used air cleaner, a ventilator or a water-filter-type air cleaner, for example.

In the filter having the above-described structure, the constituent material contains a protein that absorbs iron, radium or heavy metal (except iron), and therefore, iron, radium or heavy metal (except iron) can be removed from gas or liquid passing through the filter.

Thus, iron-containing amphibole asbestos, e.g., amosite and/or crocidolite, can be prevented from being taken into a human body. Actually, as mentioned above, if such asbestos is taken into a human body, an asbestos body is formed, a radioactive substance such as radium is deposited in this asbestos body, and canceration of normal cells is promoted by radiation emitted from this radioactive substance. However, the filter having the above-described structure is capable of preventing asbestos from being taken into a human body, and is therefore capable of preventing formation of an asbestos body, thus making it possible to inhibit canceration of normal cells.

Besides, the filter having the above-described structure is capable of removing iron contained therein, from cigarette smoke, air or drinking water inside a mine or inside a steel-making plant, etc., and is thus capable of preventing iron from being taken into a human body; hence, the filter is capable of preventing a body, in which a radioactive substance is likely to be deposited, from being formed in a human body, and is therefore capable of inhibiting canceration of normal cells.

Moreover, the filter having the above-described structure is capable of removing radium from gas or liquid passing through the filter, and is thus capable of preventing radium from being taken into a human body; hence, even if an asbestos body or the like is formed in a human body, the filter is capable of preventing a radioactive substance from being deposited in this body, and is therefore capable of inhibiting canceration of normal cells.

In other words, the filter having the above-described structure is capable of removing iron, radium or heavy metal (except iron), serving as a cancer development factor in a human body, from gas or liquid passing through the filter, and is therefore capable of inhibiting cancer development.

Further, an air cleaner of the present invention includes the filter having the above-described structure. In a commonly-used air cleaner, air is sucked into a suction path from a suction hole by operating a suction fan by a driving device, and is discharged from an exhaust hole via an exhaust path through the filter.

In this air cleaner, iron, radium or heavy metal (except iron) in air can be removed through the filter, and therefore, clean air containing no cancer development factor can be obtained. Accordingly, development of cancer in a resident of a room, in which this air cleaner is installed, can be inhibited.

Moreover, in a water-filter-type air cleaner, air is sucked into a suction path from a suction hole by operating a suction fan by a driving device, and is discharged from an exhaust hole via an exhaust path through water. Further, the filter having the above-described structure is installed in water.

In this air cleaner, iron, radium or heavy metal (except iron) in air can be removed by being dissolved in water, and therefore, clean air containing no cancer development factor can be obtained. Furthermore, since iron, radium or heavy metal (except iron) dissolved in the water can be removed through the filter, the filtering function of the water can be stabilized for a long period of time. Accordingly, with the use of this air cleaner, clean air containing no cancer development factor can be obtained with stability for a long period of time.

EXAMPLES

First Example

FIG. 1 illustrates a mask 2 including a filter 1A according to the present example. The mask 2 includes: a covering portion 21 for covering a mouth and a nose; a right ear rubber cord 22; and a left ear rubber cord 23. The covering portion 21 has a pocket portion 211 in which the filter 1A is accommodated. The pocket portion 211 is formed by overlapping a front side fabric body 212 and a back side fabric body 213, each having a rectangular shape, and by sewing the front side fabric body 212 and the back side fabric body 213 along a lower edge 214, and right and left side edges 215 and 216. It should be noted that the right ear rubber cord 22 is sewed when the right side edge 215 is sewed, and the left ear rubber cord 23 is sewed when the left side edge 216 is sewed.

The filter 1A is in the form of rectangular and sheet-like woven fabric. A single sheet of the woven fabric may be used, or a plurality of sheets of the woven fabric may be used in an overlapped manner.

Figure 2:
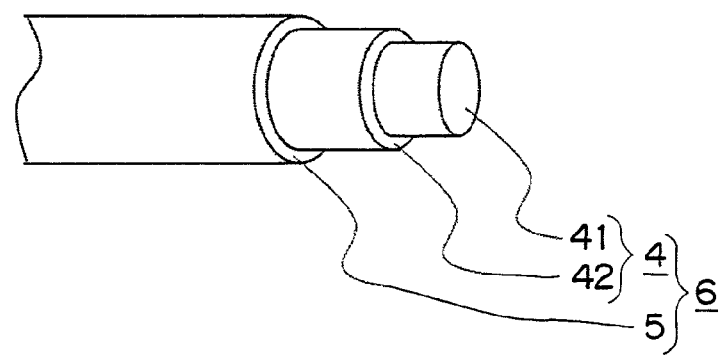
FIG. 2 is a partial perspective view illustrating an iron-containing fiber body and a protein layer, each serving as a constituent material of the filter according to the first example.

A constituent material of this woven fabric is an iron-containing fiber body 4 illustrated in FIG. 2. The iron-containing fiber body 4 includes: a fiber body 41; and an iron layer 42 formed on a surface of the fiber body 41. In other words, in the iron-containing fiber body 4, the iron layer 42, i.e., iron, is supported on the fiber body 41. The fiber body 41 is a wire body that is circular in cross section, and has a diameter of 0.1 mm. The fiber body 41 is made of a thermoplastic synthetic resin, and is specifically made of polyester. The iron layer 42 is formed over the entire surface of the fiber body 41 by sputtering.

Moreover, as illustrated in FIG. 2, a protein layer 5 is formed over an entire surface of the iron layer 42 of the iron-containing fiber body 4. A protein of the protein layer 5 is ferritin and/or hemosiderin. The protein layer 5 is easily formed on the surface of the iron layer 42 by immersing the iron-containing fiber body 4 in a protein-containing aqueous solution. It should be noted that the iron-containing fiber body 4 on which the protein layer 5 is formed will hereinafter be referred to as a "protein-binding fiber body 6".

Figure 3:
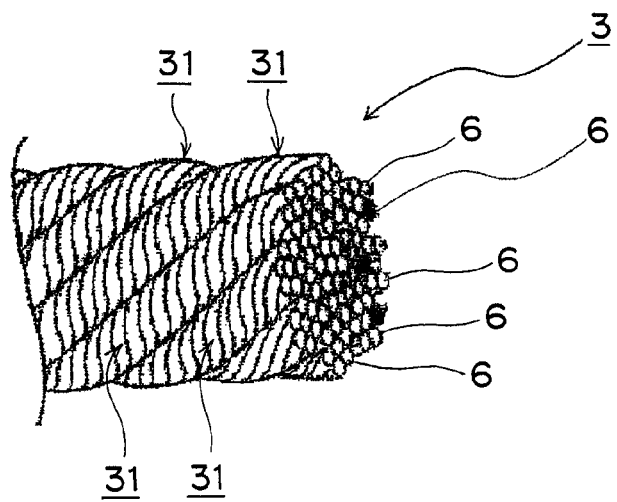
FIG. 3 is a partial perspective cross-sectional view illustrating a twine serving as a constituent material of the filter according to the first example.

Furthermore, a twine 3 illustrated in FIG. 3 is subjected to plain weave, thereby forming the woven fabric. The twine 3 is formed by twisting a plurality of paralleled yarns 31, each formed by arranging a plurality of the protein-binding fiber bodies 6 in parallel.

With use of the mask 2 including the filter 1A having the above-described structure, iron, radium or heavy metal (except iron) is absorbed into the protein layer 5 of the filter 1A, and is thus removed from air inhaled by a user. Accordingly, the user can be prevented from taking iron, radium or heavy metal (except iron) in air into his or her body, and cancer development can be inhibited.

In particular, in the mask 2, the filter 1A is moderately moistened by moisture in breath, and therefore, absorption of iron, radium or heavy metal (except iron) into the protein layer 5 is promoted. It should be noted that similar effects are obtained also when the filter 1A is moistened from the beginning.

It should be noted that in the filter 1A and the mask 2 according to the present example, the following modifications may be adopted.

(a) In order to protect the protein layer 5, a protective layer including sugar such as trehalose may be formed on the surface of the protein layer 5. This protective layer can be formed by immersing the protein-binding fiber body 6 in an aqueous solution of sugar such as trehalose. Alternatively, this protective layer can be formed by immersing the iron-containing fiber body 4 in an aqueous solution in which a protein and sugar such as trehalose are mixed with each other.

(b) The twine 3 does not have to consist exclusively of the protein-binding fiber bodies 6, but may contain other fiber body. In such a case, a material for the "other fiber body" is selected in consideration of flexibility, texture, moisture absorbency, etc.

(c) As the iron-containing fiber body 4, a fiber body made of iron may be used, and the formation of the iron layer 42 may be omitted. The fiber body made of iron can be formed by cutting an iron wire at any length.

(d) The woven fabric may be formed by using the iron-containing fiber body 4 and then the protein layer 5 may be formed on the iron-containing fiber body 4. In that case, the woven fabric may be immersed in a protein aqueous solution.

(e) The woven fabric may be formed by weaving the iron-containing fiber body 4 as it is without the use of the twine 3.

(f) A method for forming the woven fabric is not limited to plain weave, but the woven fabric may be formed by any other weave method.

(g) The fiber body 41 may have any other cross-sectional shape, or may alternatively have a flat zonal shape.

(h) The fiber body 41 may be made of polyamide or acrylic.

(i) A material for the fiber body 41 is not limited to a thermoplastic synthetic resin fiber, but any other material may be used as long as the iron layer 42 can be formed on its surface.

(j) The iron layer 42 may be formed by a known method such as vacuum deposition, electroplating or electroless plating.

(k) The iron layer 42 may be formed only partially on the surface of the fiber body 41.

(l) The protein layer 5 may be formed only partially on the surface of the iron-containing fiber body 4.

(m) The shape of the mask 2 is not limited to a planar shape illustrated in FIG. 1, but the mask 2 may have a three-dimensional shape conforming to irregularities of a nose and a mouth and having a high hermeticity.

Second Example

Although the filter 1A according to the first example is in the form of the woven fabric, a filter according to the present example is in the form of the nonwoven fabric. This filter can be formed by tangling the iron-containing fiber body 4 or protein-binding fiber body 6 of the first example, which is cut at a length of a few millimeters to a few centimeters, singly or together with other fiber body by a known method. It should be noted that the protein layer 5 is formed on the iron-containing fiber body 4 before tangling, or the protein layer 5 is formed thereon after tangling. Other structures and modifications of the present example are similar to those of the first example.

The filter of the present example is also capable of removing iron, radium or heavy metal (except iron) in air. Accordingly, the present example can achieve effects similar to those of the first example.

Third Example

Figure 4:
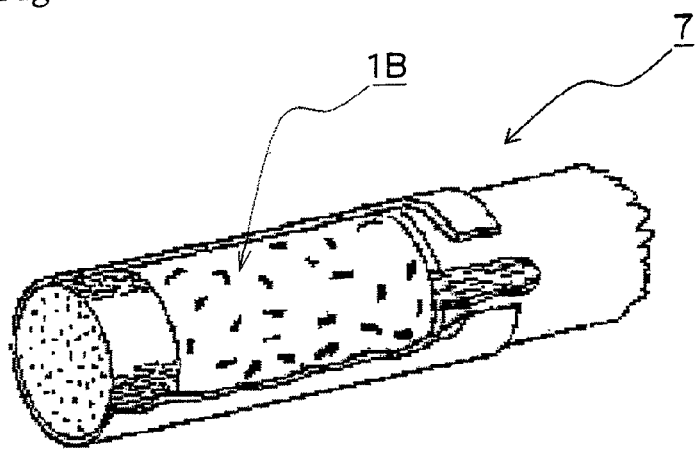
FIG. 4 is a partially broken fragmentary view of a cigarette including a filter according to a third example.
Figure 5:
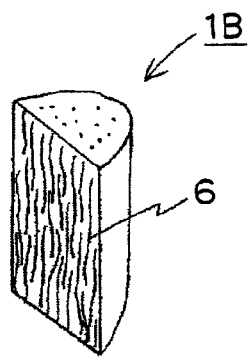
FIG. 5 is a perspective view illustrating the filter according to the third example, which is longitudinally divided.

FIG. 4 is a partially broken fragmentary view of a cigarette 7 including a filter 1B according to the present example. FIG. 5 is a perspective view illustrating the filter 1B that is longitudinally divided. Although the filter 1A of the first example is in the form of the woven fabric, the filter 1B of the present example is in the form of the molded body. The filter 1B is formed by molding the protein-binding fiber body 6 of the first example, which is cut at a length of a few millimeters to a few centimeters, into a cylindrical shape together with other fiber body by compression molding. It should be noted that the iron-containing fiber body 4 of the first example may be molded singly or together with other fiber body by a known method and then the protein layer 5 maybe formed on the iron-containing fiber body 4, thus forming the filter 1B. Other structures and modifications of the present example are similar to those of the first example.

The filter 1B of the present example is also capable of removing iron, radium or heavy metal (except iron) in air. Accordingly, the present example is capable of achieving effects similar to those of the first example, and is capable of inhibiting cancer development in smokers in particular.

Fourth Example

Figure 6:
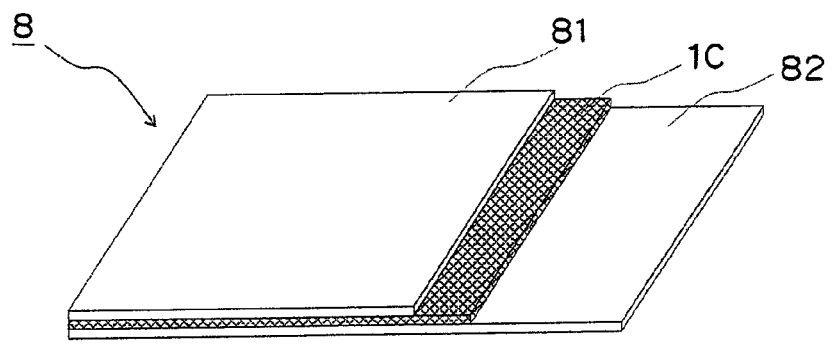
FIG. 6 is a partially broken perspective view of a filter plate including a filter according to a fourth example.

FIG. 6 is a partially broken perspective view of a filter plate 8 including a filter 1C according to the present example. This filter plate 8 is used by being attached to a suction hole or an exhaust hole of an air cleaner, an outlet of a ventilator, or the like, for example. Although the filter 1A of the first example is in the form of the woven fabric, the filter 1C of the present example is in the form of the mesh body. The filter plate 8 is formed by sandwiching the filter 1C between two sheets of nonwoven fabric 81 and 82 from both sides. The iron-containing fiber body 4 of the first example is braided into a mesh pattern singly or together with other fiber body, and then the protein layer 5 is formed on the iron-containing fiber body 4, thus forming the filter 1C. It should be noted that the filter 1C may be formed by braiding the protein-binding fiber body 6 of the first example into a mesh pattern singly or together with other fiber body. Other structures and modifications of the present example are similar to those of the first example.

The filter 1C of the present example is capable of removing iron, radium or heavy metal (except iron) in air similarly to the first example. Hence, an air cleaner including the filter plate 8 is capable of removing iron, radium or heavy metal (except iron) from suction air, and exhausting the resultant air. Further, a ventilator including the filter plate 8 is capable of discharging exhaust air, from which iron, radium or heavy metal (except iron) has been removed, to outside. Accordingly, cancer development factors in air can be decreased.

It should be noted that the filter 1C of the filter plate 8 is preferably moderately moistened by water when it is used. Thus, absorption of iron, radium or heavy metal (except iron) into the protein layer 5 of the filter 1C is promoted. For this purpose, an air cleaner or a ventilator is preferably provided with a humidifying means for moistening the filter 1C.

Fifth Example

Figure 7:
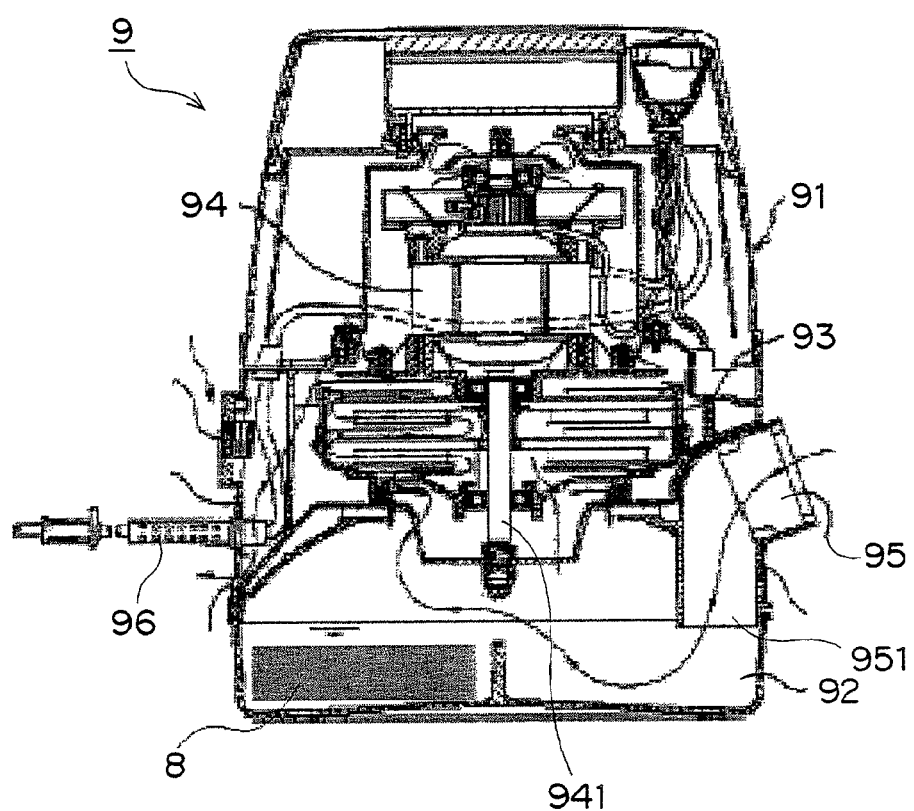
FIG. 7 is a longitudinal cross-sectional view illustrating a water-filter-type air cleaner including a filter plate according to the fifth example.

FIG. 7 is a longitudinal cross-sectional view illustrating a water-filter-type air cleaner 9 including the filter plate 8 of the fourth example. The air cleaner 9 includes a water tank 92, a multi-stage suction fan 93 and a drive motor 94 within a casing 91, and further includes an outside air suction pipe 95 and an exhaust pipe 96, which are passing through the casing 91. The water tank 92 stores water at a bottom inside the casing 91. An inner end portion 951 of the outside air suction pipe 95 is located below the surface of water stored in the water tank 92. The suction fan 93 is attached to a vertical output shaft 941 of the drive motor 94. Furthermore, the filter plate 8 is installed in water stored in the water tank 92.

In the air cleaner 9 having the above-described structure, upon rotation of the suction fan 93 by an operation of the drive motor 94, a negative pressure is caused in the casing 91, and outside air is sucked through the outside air suction pipe 95. Then, the sucked air goes through water of the water tank 92. Thus, iron, radium or heavy metal (except iron) in the air will be dissolved in water. Accordingly, clean air is discharged to outside from the exhaust pipe 96. In other words, air is filtered through water of the water tank 92. In this manner, the air cleaner 9 cleans air.

On the other hand, iron, radium or heavy metal (except iron) dissolved in water is absorbed into the protein layer 5 of the filter 1C of the filter plate 8. Thus, iron, radium or heavy metal (except iron) is removed from water of the water tank 92. Accordingly, water of the water tank 92 is cleaned. Consequently, the filter 1C is capable of stabilizing the filtering function of water of the water tank 92 for a long period of time.

Therefore, the air cleaner 9 having the above-described structure includes the filter plate 8 in water of the water tank 92, and is thus capable of cleaning air with stability for a long period of time.

A filter of the present invention is capable of inhibiting cancer development caused based on a new development mechanism, and is thus industrially very useful.

What is claimed is:
1. A filter for filtering gas or liquid, comprising:
a filter material, wherein a constituent material of the filter is an iron-containing fiber body, the iron-containing fiber body being a fiber body which is made of polyester and has an iron layer, the iron layer being formed over the entire surface of the fiber body by sputtering, and wherein a protein layer is formed over a surface of the iron layer and a protein of the protein layer is ferritin or hemosiderin.

2. An air cleaner comprising the filter according to claim 1.

3. The air cleaner according to claim 2, wherein the filter is moistened by water.

* * * * *